ARNOLD & IRVING.
Gas Burner.
No. 62,725.                      Patented March 12, 1867.
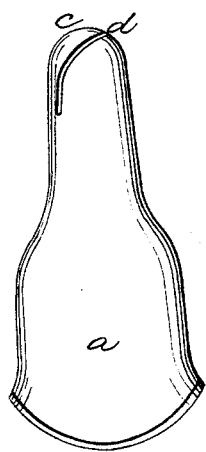
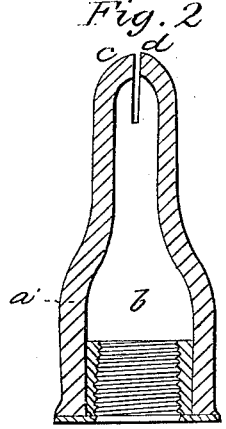

United States Patent Office

THOMAS G. ARNOLD AND BENJAMIN IRVING, OF NEW YORK, N. Y.

Letters Patent No. 62,725, dated March 12, 1867.

IMPROVEMENT IN PORCELAIN GAS BURNERS.

The Schedule referred to in these Letters Patent and making part of the same.

TO ALL WHOM IT MAY CONCERN:

Be it known that we, THOMAS G. ARNOLD and BENJAMIN IRVING, of the city, county, and State of New York, have invented certain new and useful Improvements in Glazed Porcelain Gas Burners; and we do hereby declare that the following is a full description of the same.

The object of our invention is, first, to supersede the use of metal gas burners, and thus get rid of the tendency of such metal gas burners to gum up, in consequence of the corrosion of the metal by the action of the gas; second, to make a burner with a durable and highly polished surface, so as to preserve always a clean and elegant appearance; third, to make a burner with a highly reflective surface, and thus add to the brilliancy of the jet of flame; and fourth, to make a burner of a white or variegated color, and thereby make it ornamental as well as useful. And the nature of our invention consists, first, in making a porcelain gas burner with a glazed surface entirely covering the nipple of the burner, before being perforated or slit for the escape of the jet of gas; and second, in the perforating or slitting of a glazed porcelain gas burner by machinery or mechanical means after the burner has been glazed. But to describe our invention more particularly, we will refer to the accompanying drawings, forming a part of this specification, the same letters of reference wherever they occur referring to like parts.

Figure 1 is a perspective view of the burner.
Figure 2 is a cut section of the same.

Letter $a$ represents the porcelain base or "biscuit," which is made of any suitable diameter and length required, with a hollow core, $b$. The material of which the "biscuit" is made is feldspar principally, though other porcelain or earthenware clays may be used for the purpose. In making the "biscuit" it is moulded with a solid cone or nipple, $c$, that is without any vent in it. The object of thus making the "biscuit" will be explained when explaining the operation of glazing the "biscuit." When the "biscuit" has been properly dried it is put into an oven and baked. It is then removed from the oven and coated over its entire external surface with a glazing composition, and then again put in an oven to vitrify the glaze. It will be obvious that if the cone or nipple of the "biscuit" was perforated or slitted for the escape of gas before the glaze was applied, it would be impossible to prevent the glazing composition from flowing into the apertures and filling them up when being vitrified, or so rounding their edges as to make the burners practically worthless; or if attempting to avoid these objections by not coating the end of the cone or nipple with the glaze, then an equally serious objection is presented in the fact that the exposed part soon becomes black, and therefore destroys the beauty and cleanliness of appearance of the burner. When the glazing has been perfected, the burner is then perforated or slitted, $d$, by mechanism specially adapted for that purpose. It will be observed that by this method of perforating or slitting the end of the cone or nipple, that the edges of the perforations or slits are perfectly glazed and as sharp cut as it is possible to make them in metal. This is very important in making vents to gas burners, and without such sharpness of edges of the apertures they are totally unfit for use. By our method of making the burner, therefore, all the advantages of metal burners are retained, while the advantages of brilliancy of effect, cleanness of appearance, and durability of wear are added to the advantages of the metal burners.

Having now described our invention, we will proceed to set forth what we claim, and desire to secure by Letters Patent of the United States—

We claim the making of a glazed porcelain gas burner, by perforating or slitting it after being glazed, for the purposes and in manner substantially as hereinbefore set forth.

T. G. ARNOLD,
B. IRVING.

Witnesses:
C. L. BARRITT,
JAS. HENDERSON.